April 4, 1967 B. D. LOUGHLIN 3,312,778

CONTROL APPARATUS FOR A TELEVISION RECEIVER

Filed Oct. 31, 1963 3 Sheets-Sheet 1

CONTROL APPARATUS FOR A TELEVISION RECEIVER

Filed Oct. 31, 1963 3 Sheets-Sheet 3

3,312,778
Patented Apr. 4, 1967

3,312,778

CONTROL APPARATUS FOR A TELEVISION RECEIVER

Bernard D. Loughlin, Centerport, N.Y., assignor to Hazeltine Research Inc., a corporation of Illinois Filed Oct. 31, 1963, Ser. No. 320,392
13 Claims. (Cl. 178—5.4)

Figures 1, 3:
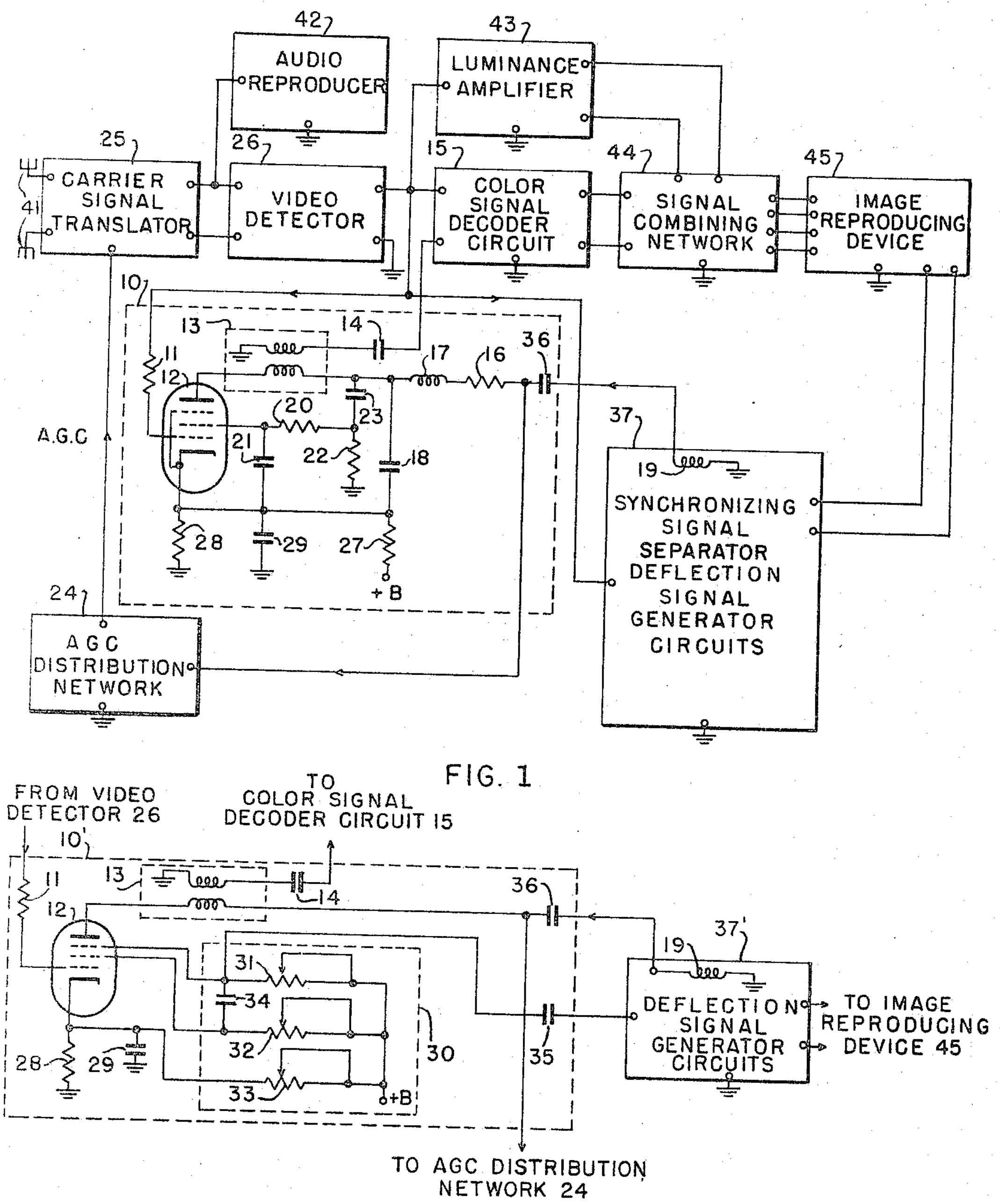

The present invention relates to control apparatus for use in a television receiver adapted to receive a composite color signal. The function of this control apparatus is to separate deflection synchronizing pulses and color synchronizing signals from the composite color signal as well as to derive an automatic-gain-control (AGC) bias from the reference level which follows the deflection synchronizing pulses. This reference level is commonly known as the back porch level.

In construction of television receivers adapted to receive a composite color signal, it has heretofore been customary to provide separate and distinct apparatus, including vacuum tube networks, for performing each of the functions of synchronizing pulse separation, color synchronizing signal or color burst separation and automatic gain control. However, in the highly competitive television industry, manufacturing cost reductions are always desirable. The division of the above receiver functions among separate apparatus adds unnecessary cost to the finished product. Control apparatus in accordance with the present invention effects a sizable cost reduction by combining several of these functions in the operation of a network containing only one electronic valve such as a vacuum tube.

Moreover, control apparatus of this invention eliminates the undesirable effects of black level shift in television receivers employing D.-C. restoration by deriving an AGC bias from the back porch level of the composite color signal. Black level shift is thus eliminated because the back porch level differs from black level in the composite color signal by only a small fixed amount known in the art as "setup."

It is, therefore, an object of the present invention to provide a multi-purpose control apparatus which performs the functions of color burst separation and the deriving of an AGC bias from the back porch level in a composite color signal.

It is a further object of the present invention to provide a multi-purpose control apparatus which, in addition to the two functions recited above, also separates synchronizing pulses from a composite color signal.

It is still another object of the present invention to eliminate the duplication of apparatus heretofore required separately to perform the above-recited functions by providing a single, multi-purpose control apparatus which performs them all.

In accordance with the invention, in a television receiver having an image-reproducing apparatus, including a signal-translating channel and an image-reproducing device, control apparatus comprises signal supply means for supplying at least the horizontal back porch blanking level and the synchronizing pulses of a received television picture signal and means for supplying keying pulses having peak portions occurring substantially in overlapping time relationship with the synchronizing pulses. The control apparatus also comprises means, including only one electron device having the keying pulses coupled to an electrode thereof, responsive to the supplied signals for deriving a signal representative only of variations in the amplitude of the blanking level and for separating the synchronizing pulses from the supplied signal, means responsive to the separated pulses for controlling the generation of a raster in the image-reproducing device and means responsive to the derived signal for controlling the operation of at least one element in the signal translating channel.

In accordance with another feature of the invention, a television receiver adapted to reproduce a color-television picture, the receiver having image-reproducing apparatus including a signal-translating channel and an image-reproducing device, control apparatus comprises signal supplying means for supplying at least the horizontal back porch blanking level and the color synchronizing signals of a received composite color signal. The control apparatus also comprises means, including only one electron device responsive to the supplied signals for deriving a signal representative of variations in amplitude of the blanking level and for separating the color synchronizing signal from the supplied signals, means responsive to the separated color synchronizing signals for controlling the operation of a color signal decoder in the image-reproducing apparatus and means responsive to the derived signal for maintaining the composite color signal in the signal-translating channel within a desired signal intensity range for a wide range of received composite color signal intensities.

In accordance with a further feature of the invention, a television receiver adapted to reproduce a color television picture the receiver having image-reproducing apparatus including a signal-translating channel and an image-reproducing device, control apparatus comprises signal supplying means for supplying at least the horizontal back porch blanking level, synchronizing pulses and color synchronizing signals of a composite color signal. The invention also comprises means, including only one electron device, responsive to the supplied signals and pulses for deriving a signal representative of the variations in the amplitude of the blanking level and for separating the synchronizing pulses and the color synchronizing signals from the supplied signals, means responsive to the separated synchronizing pulses for controlling the generation of a raster in the image-reproducing device, means responsive to the separated color synchronizing signals for controlling the operation of at least one chrominance signal processing element in the image-reproducing apparatus and means responsive to the derived signal for generating an automatic-gain-control signal thereby to control the gain of at least one element in the signal-translating channel so as to maintain the composite color signal in the signal-translating channel within a desired signal intensity range for a wide range of received composite color signal intensities.

For a better understanding of the present invention together with other and further objects thereof, reference is had to the following description taken in connection with the accompanying drawings, and its scope will be pointed out in the appended claims.

Figures 2A, 2B:
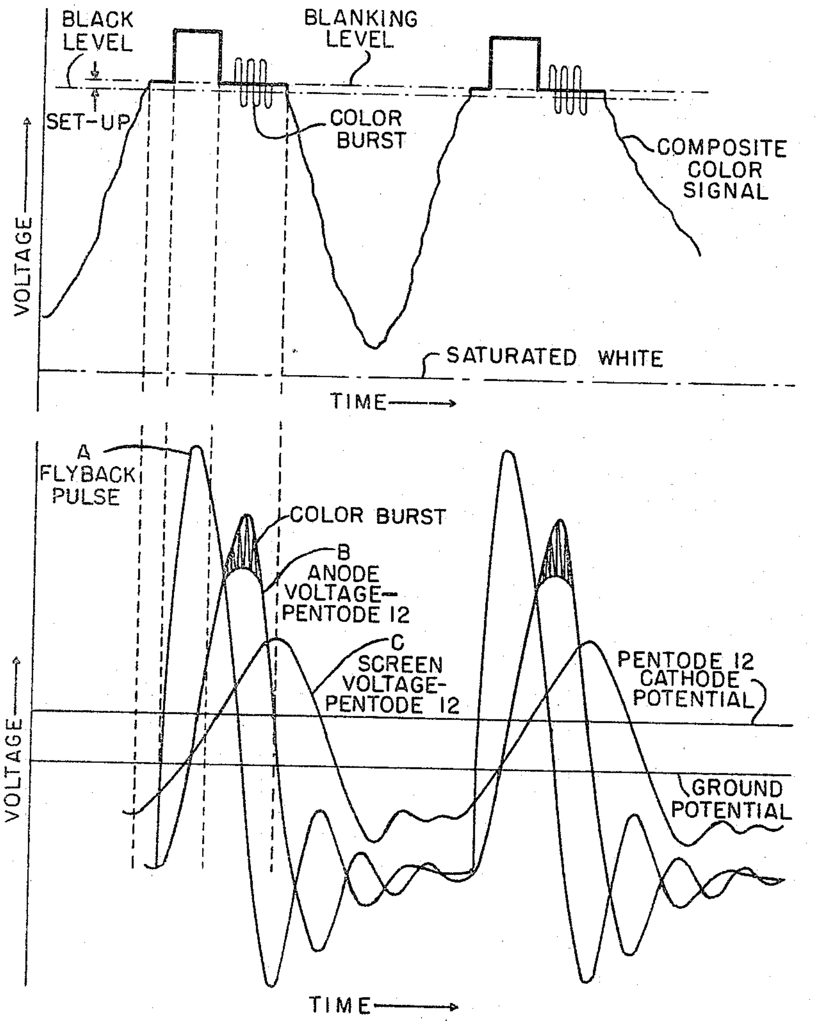
Figure 5:
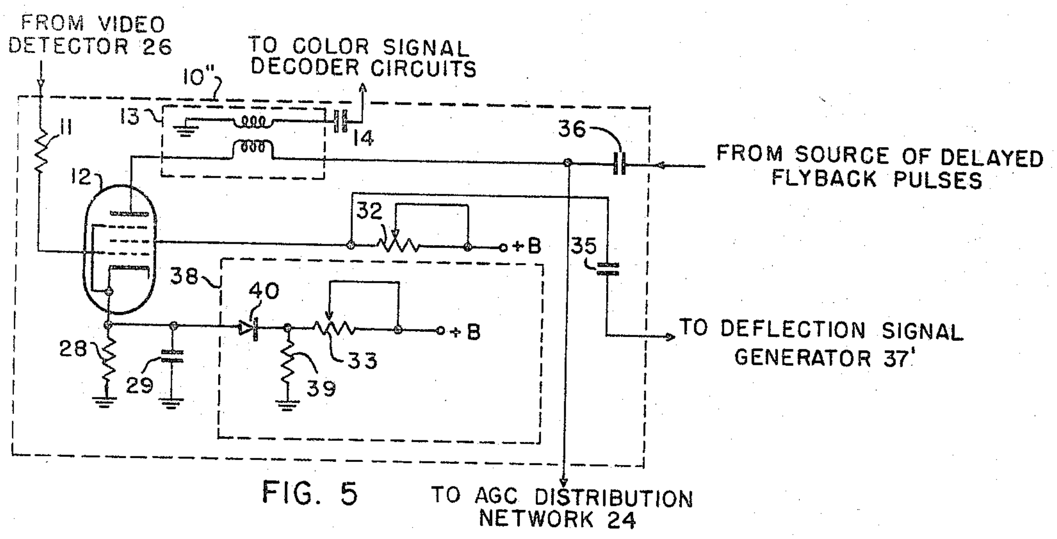

Referring to the drawings:

FIG. 1 shows a television receiver which includes one form of control apparatus in accordance with the present invention;

FIGS. 2*a* and 2*b* show voltage waveforms useful to explain the operation of control apparatus shown in FIG. 1;

FIG. 3 shows a television receiver which includes another embodiment of control apparatus in accordance with the present invention;

FIGS. 4*a*–4*d* show voltage and current waveforms useful to explain the operation of control apparatus shown in FIG. 3, and FIG. 5 shows still another embodiment of control apparatus of the present invention suitable for use in the environment of FIG. 3.

Wherever possible, apparatus and network elements in

FIGS. 1, 3 and 5 have been designated with the same symbols.

FIG. 1 shows a television receiver adapted to receive a composite color signal and includes an example of control apparatus 10 which comprises one embodiment of the present invention. With the exception of apparatus 10, representative embodiments of the remaining portions of this receiver can be found in such standard reference publications as "Principles of Color Television" by the Hazeltine Laboratories Staff.

Control apparatus 10 of the present invention comprises means to derive a signal representative of variations in the amplitude of the horizontal back porch blanking level of a composite color signal from the back porch level and to separate the color burst from that signal. To this end, at least the color burst and the horizontal back porch blanking level are supplied through a resistance 11 to a control electrode of an electron device, for example, a pentode vacuum tube 12 which is operated as a keyed rectifier. The manner in which pentode 12 is caused to conduct is explained in detail below. But, when anode current is drawn by the pentode 12, the color burst present at the control grid is amplified and appears as a voltage across a tuned network 13 for separating the color synchronizing signals. This network may be, for example, a transformer tuned to the frequency of the color burst. The output signal developed across network 13 is coupled through a capacitance 14 to a color signal decoder circuit 15 incorporated in the image-reproducing apparatus of the television receiver to control a characteristic thereof.

The pentode 12 is keyed into conduction only during the back porch reference level by the application to the anode and screen electrodes of pentode 12, of positive-going, voltage pulses, synchronous in time with the back porch level. These pulses are differentially delayed as shown in FIG. 2*b* so that conduction does not occur until after the horizontal sync pulse ends and is cut off before the beginning of video interval. This is more fully explained in United States application, Ser. No. 223,494, filed September 13, 1962, and entitled, "Control Apparatus for a Television Receiver," and now Patent No. 3,231,669. As shown in FIG. 1 horizontal flyback pulses, shown as waveform A in FIG. 2*b*, obtained from the line scan output transformer 19 of the synchronizing signal separator and deflection signal generator circuits 37 are coupled through capacitor 36, an initial delay circuit 16, 17, 18 and the primary winding of transformer 13 to the anode of pentode 12. The flyback pulses are also applied to the screen of pentode 12 through an additional delay network 20 and 21. Elements 22 and 23 provide A.-C. coupling and a D.-C. ground return circuit respectively. The resultant pulses are shown in FIG. 2*b* with waveform B appearing at the anode and waveform C appearing at the screen of pentode 12. From an inspection of FIG. 2*b* and its time relationship to FIG. 2*a*, which shows a portion of a typical composite color signal, it is seen that anode current is drawn by pentode 12 only when both the anode and the screen electrodes have a potential which is positive with respect to the cathode potential, that is, during the back porch time interval. The amplified color burst is shown in the first positive-going peak of waveform B which also represents a portion of the output signal developed at the anode.

The pulse of anode current developed at the pentode 12 is utilized to derive an AGC bias and is coupled to a conventional AGC distribution network 24 which integrates the current pulse to develop an AGC bias voltage. The network 24 supplies this voltage to a conventional carrier signal translator 25 to maintain the composite color signal coupled to a video detector 26 within a desired signal intensity for a wide range of received signal intensities. Additionally, the derived pulse of anode current at pentode 12 may be used for stabilizing the blanking level in the image-reproducing device 45 whereby correct black level operation at device 45 is obtained. Circuits useful to effect this result are disclosed in copending application Ser. No. 223,493, filed September 13, 1962, and entitled "Control Apparatus for a Television Receiver" and now abandoned.

Thus, at the heart of this invention is a keyed rectifier circuit to whose output terminal is connected a tuned circuit responsive only to the color burst frequency. The circuit is keyed into conduction by the application of suitably timed voltage pulses. The output of the rectifier circuit comprises an amplified color burst and a signal whose average value is used, for example, to provide an AGC bias to gain-controlled circuits in the television receiver. The AGC bias is derived from the back porch level in the composite color signal.

Control apparatus 10 may additionally include a cathode biasing network, for example, resistances 27 and 28 and a bypass capacitance 29 for providing a fixed level of D.-C. bias voltage at the cathode of pentode 12. The bias, so provided by coupling this network to a suitable source of D.-C. voltage, fixes in a conventional manner the level of the receiver input signal at which an AGC bias is operative.

While applicant does not wish to be limited to any particular set of circuit parameters, the following have proved useful in the control apparatus 10 of FIG. 1:

| | | |
|---|---|---|
| Resistance **16** | ohms | [1] 6.8K |
| Resistance **20** | do | 100K |
| Resistance **22** | do | 330K |
| Resistance **27** | do | 2.7K |
| Resistance **28** | do | 39K |
| Capacitance **14** | picofarads | 10 |
| Capacitance **18** | do | 150 |
| Capacitance **21** | do | 22 |
| Capacitance **23** | microfarad | 0.005 |
| Capacitance **29** | do | 0.1 |
| Capacitance **36** | picofarads | 470 |
| Inductance **17** | millihenries | 35 |
| Pentode **12** | | ½6U8 |

[1] 1 watt.

Control apparatus 10' of FIG. 3 is another form of the present invention and includes a single vacuum tube network which in addition to deriving a signal used as an AGC bias and separating the color burst from the supplied composite color signal separates deflection synchronizing pulses as well.

The manner in which the color burst is separated from the supplied composite color signal has already been described with reference to apparatus 10. The aperture means 30 constructed in accordance with the invention and included in apparatus 10', apertures on synchronizing pulses as well as noise pulses, and thereby is effective to assure that the signal derived in network 10' is not developed from the supplied synchronizing pulses. Moreover, the synchronizing pulse aperture means 30 is used to separate the synchronizing pulses from the composite color signal.

Figure 4A:
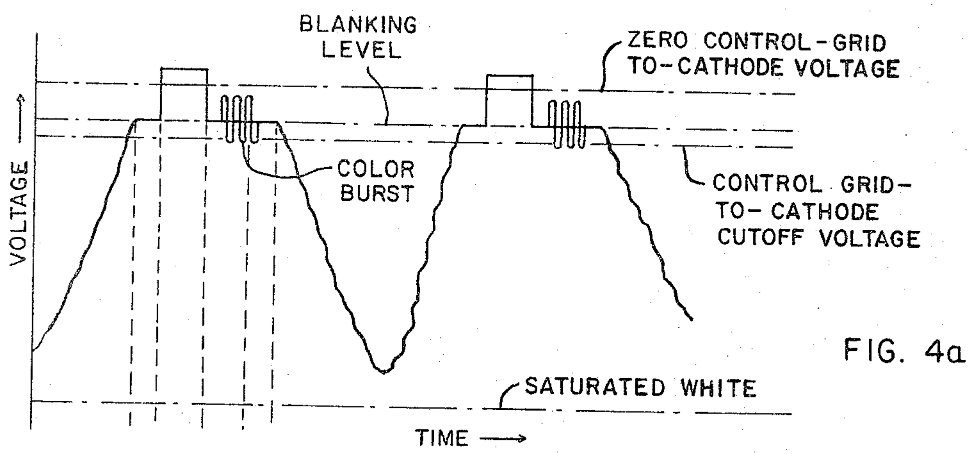
Figure 4B:
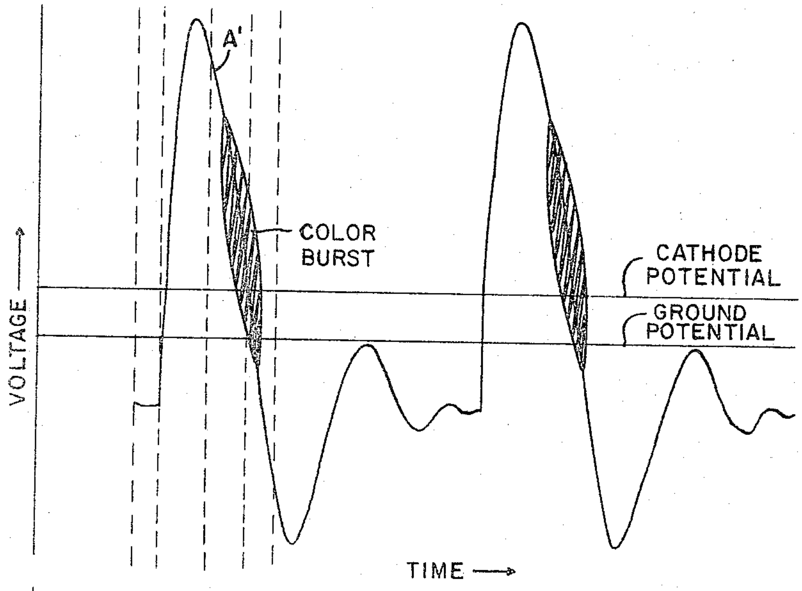

The aperture means 30 comprises a biasing network for example, a coupling capacitance 34 and resistances 31, 32 and 33 which are coupled to a source of D.-C. voltage. Undelayed horizontal flyback pulses are coupled to the anode of pentode 12 from the transformer winding 19. With reference to FIGS. 4*a* and 4*b*, neglecting for the moment the effect of aperture means 30, it is seen that pentode 12 can draw anode current only during the time occurrence of the flyback pulses at the anode. The anode voltage is shown as wavefrom A' in FIG. 4*b*. Moreover, the D.-C. bias applied to the electrodes of pentode 12 is so adjusted that the instantaneous variations of screen current are negligible at all times except during the time occurrence of synchronizing pulses or impulse noise at the control grid of this tube. During the latter time intervals, the screen current increases and voltage pulses constituting amplified, inverted synchronizing pulses or impulse noise spikes are developed across resistance 32.

These pulses are coupled through capacitance 35 to the deflection signal generator circuits 37'.

Figure 4C:
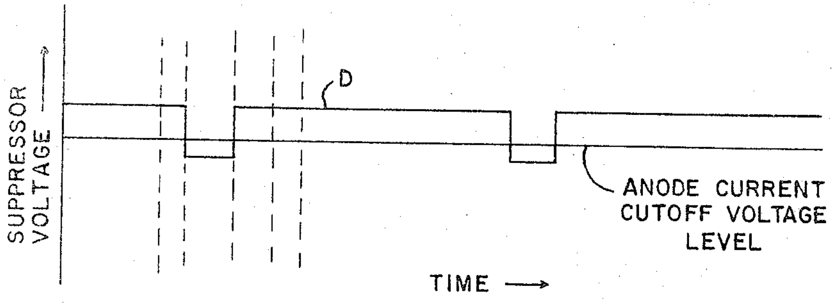
Figure 4D:
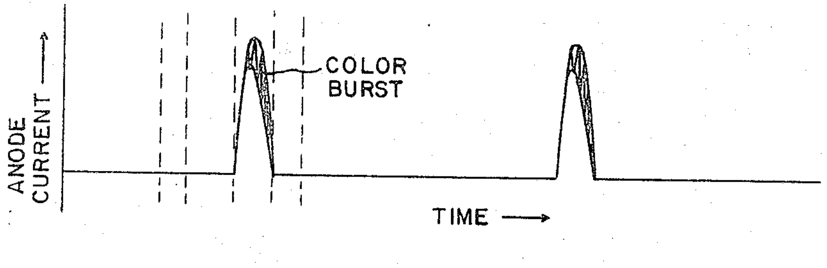

In accordance with this aspect of the present invention, the instantaneous variations of screen voltage are coupled to the suppressor electrode through capacitance 34 and during the time occurrence of synchronizing pulses or noise spikes the voltage variations at the suppressor prevent the pentode 12 from conducting anode current. The instantaneous suppressor voltage is shown in FIG. 4*c* as waveform D and the effect on the anode current of using the synchronizing pulse aperture means 30 to control anode current conduction is shown qualitatively in FIG. 4*d*. As a result, anode current is drawn only during the back porch interval and is used for example, to establish an AGC bias in the manner described with reference to FIG. 1.

Thus control apparatus 10' comprises a keyed rectifier circuit to whose output terminal is connected a tuned circuit responsive only to the color burst frequency. The circuit is keyed into conduction by the interaction of the application of suitably timed voltage pulses and the operation of an aperture. When conducting, the rectifier circuit's output includes separated color burst and synchronizing pulses and a signal whose average value is used, for example, to provide an AGC bias which is derived from the back porch level in the composite color signal.

Another form of the present invention is shown in FIG. 5 as apparatus 10''. This apparatus performs the same functions as those described with reference to apparatus 10'. However, some points of difference are to be noted. Synchronizing pulse aperture means 30 is not used in the apparatus of FIG. 5 to prevent pentode 12 from conducting anode current is response to synchronizing pulses or impulse noise. Instead, delayed flyback voltage pulses are applied to the anode of this pentode. For example, flyback pulses may be coupled from the transformer winding 19 to the anode through a delay means comprising resistance, inductance and capacitance parameters as described with reference to apparatus 10 of FIG. 1. Alternately, a delayed anode keying pulse can be derived from a ringing circuit connected to the cathode of the horizontal output tube in a deflection system 37'. Circuits useful for deriving pulses in this manner are described in B. D. Loughlin's and S. P. Ronzheimer's copending application Ser. No. 224,276, filed Sept. 13, 1962 and entitled, "Control Apparatus for a Television Receiver" and now Patent No. 3,249,695.

Next, a biasing network 38 is provided to vary the threshold level at which a delayed AGC bias is applied to a carrier signal translator 25. Use of network 38 which comprises, for example, resistances 33 and 39 and a diode 40 assures that synchronizing pulses can be separated from very weak television signals intercepted by an antenna system 41.

In some applications of control apparatus constructed in accordance with the persent invention, it may be necessary to have an auxiliary means to supply the color burst to the control apparatus because the level of the color burst appearing at the detector 26 output terminals may not be sufficient to actuate the pentode 12. One obvious method of supplying the color burst is to couple the output of a conventional chrominance amplifier in the color signal decoder circuit 15 to the control grid of the pentode 12.

Brief consideration is now given to the over-all construction and operation of television receivers in which the present invention is used. With reference to the receiver of FIG. 1, there is shown image-reproducing apparatus which includes a signal-translating channel and an image-reproducing device 45. A television signal including video, audio and synchronizing information is intercepted by an antenna system 41 and supplied to the signal-translating channel which comprises, for example, a carrier signal translator 25, a video detector 26, luminance amplifier 43, a color signal decoder circuit 15 and a signal combining network 44.

The intercepted television signal is amplified and has its carrier frequency converted to an intermediate frequency by the signal translator 25. The intermediate frequency signal is supplied to a video detector 26 which recovers the composite color signal from the intermediate frequency carrier. Also coupled to the output terminals of the translator 25 is an audio reproducer 42 which detects and amplifies the intercarrier frequency signal and then recovers and reproduces the audio information carried by this signal.

A luminance amplifier 43 coupled to the video detector 26 amplifies and translates the luminance portion of the composite color signal to a signal combining network 44. A color signal decoder circuit 15 decodes, amplifies and translates the chrominance portion of the composite color signal to the signal combining network 44. The network 44 includes conventional matrix circuits which combine the supplied luminance and chrominance information to derive desired color difference signals which are supplied to an image-reproducing device 45 to develop a television picture.

In those receivers which utilize control apparatus 10, synchronized line and field scanning signals are supplied to an image-reproducing device 45 by synchronizing signal separator and deflection signal generator circuits 37. In those receivers which utilize control apparatus 10' or 10'', the synchronized scanning signals are supplied by deflection signal generator circuits 37' which are responsive to the synchronizing pulses separated and supplied by the control apparatus.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a television receiver having an image-reproducing apparatus, including a signal-translating channel and an image-reproducing device, control apparatus comprising:

signal supply means for supplying at least the horizontal back porch blanking level and the synchronizing pulses of a received television picture signal;

means for supplying keying pulses having peak portions occurring substantially in overlapping time relationship with said synchronizing pulses;

means, including only one electron device having said keying pulses coupled to an electrode thereof, responsive to said supplied signals for deriving a signal representative only of variations in the amplitude of said blanking level and for separating said synchronizing pulses from said supplied signal;

means responsive to the separated pulses for controlling the generation of a raster in said image-reproducing device;

and means responsive to said derived signal for controlling the operation of at least one element in the signal translating channel.

2. Control apparatus constructed in accordance with claim 1, in which said electron device is a pentode vacuum tube, the control grid of which is direct-current coupled to said signal supplying means, the anode is coupled to the source of keying pulses and in which the screen and suppressor electrodes are coupled together through a synchronizing pulse aperture means for preventing the deriving of said amplitude variation-representative signal from said synchronizing pulses and for separating said synchronizing pulses from said supplied signals.

3. In a television receiver having an image-reproducing apparatus, including a signal-translating channel and an image-reproducing device, control apparatus comprising:

signal supply means for supplying at least the horizontal back porch blanking level and the synchronizing pulses of a received television picture signal;

means for supplying flyback pulses which have peak portions occurring substantially in overlapping time relationship with said synchronizing pulses;

means, including only one electron device, a pentode vacuum tube, responsive to said supplied signals and pulses for deriving a signal representative of variations in the amplitude of said blanking level and for separating said synchronizing pulses from said supplied signals and in which the control grid of said tube is direct-current coupled to said signal supplying means, the anode is coupled to the source of flyback pulses and the screen and suppressor electrodes are coupled together through synchronizing pulse aperture means for preventing the deriving of said amplitude variation-representative signal from said synchronizing pulses and used for separating said synchronizing pulses from said supplied signals;

deflection signal generating means responsive to said separated pulses for controlling the generation of a raster in said image-reproducing device;

and means responsive to said derived signal for generating an automatic gain control signal thereby to control the gain of at least one element in said signal translating channel.

4. In a television receiver adapted to reproduce a color-television picture, said receiver having image-reproducing apparatus including a signal-translating channel and an image-reproducing device, control apparatus comprising:

signal supplying means for supplying at least the horizontal back porch blanking level and the color synchronizing signals of a received composite color signal;

means, including only one electron device, responsive to said supplied signals for deriving a signal representative of variations in amplitude of said blanking level and for separating said color synchronizing signals from said supplied signals;

means responsive to said separated color synchronizing signals for controlling the separation of a color signal decoder in the image-reproducing apparatus;

and means responsive to said derived signal for maintaining the composite color signal in said signal-translating channel within a desired signal intensity range for a wide range of received composite color signal intensities.

5. Control apparatus constructed in accordance with claim 4, in which said electron device is the rectifying element in a keyed rectifier circuit direct-current coupled to said signal supplying means and wherein said control apparatus additionally includes pulse generating means for supplying pulses to said electron device to key said device into conduction, said supplied pulses being synchronous with said back porch blanking level.

6. Control apparatus constructed in accordance with claim 5, in which said pulse generating means comprises means for supplying flyback pulses which have peak portions occurring in overlapping time relationship with said synchronizing pulses and means coupled to said flyback pulse supplying means for delaying said flyback pulses such that the peak portions thereof are in nonoverlapping time relationship with said synchronizing pulses but are synchronous with said back porch blanking level.

7. Control apparatus constructed in accordance with claim 5, in which the anode of said electron device is coupled to said pulse generating means through tuned circuit means for separating said color synchronizing pulses from said supplied signals.

8. In a television receiver adapted to reproduce a color-television picture, said receiver having image-reproducing apparatus including a signal-translating channel and an image-reproducing device, control apparatus comprising:

signal supplying means for supplying at least the horizontal back porch blanking level and the color synchronizing signals of said composite color signal;

means for supplying flyback pulses which have peak portions occurring in overlapping time relationship with said synchronizing pulses;

means, including only one electron device, responsive to said supplied signals and pulses for deriving a signal representative of the variations in the amplitude of said blanking level and for separating said color synchronizing signals from said supplied signals, said electron device being a pentode vacuum tube, the control grid of which is direct-current coupled to said signal supplying means and the anode and screen electrode of which are coupled to said pulse supplying means through means for delaying said pulses such that the peak portions of said delayed pulses are substantially in overlapping time relationship with said back porch blanking level, the coupling to said anode being additionally through turned circuit means used for separating said color synchronizing signals from said supplied signals;

means responsive to said separated color synchronizing signals for controlling the operation of a color signal decoder in the image-reproducing apparatus;

and means responsive to said derived signal for maintaining the composite color signal in said signal-translating channel within a desired signal intensity range for a wide of received composite color signal intensities.

9. In a television receiver adapted to reproduce a color television picture said receiver having image-reproducing apparatus including a signal-translating channel and an image-reproducing device, control apparatus comprising:

signal supplying means for supplying at least the horizontal back porch blanking level, synchronizing pulses and color synchronizing signals of a composite color signal;

means, including only one electron device, responsive to said supplied signals and pulses for deriving a signal representative of the variations in the amplitude of said blanking level and for separating said synchronizing pulses and said color synchronizing signals from said supplied signals;

means responsive to said separated synchronizing pulses for controlling the generation of a raster in said image-reproducing device;

means responsive to said separated color synchronizing signals for controlling the operation of at least one chrominance signal processing element in the image reproducing apparatus;

and means responsive to said derived signal for generating an automatic-gain-control signal thereby to control the gain of at least one element in the signal translating channel so as to maintain the composite color signal in the signal translating channel within a desired signal intensity range for a wide range of received composite color signal intensities.

10. Control apparatus constructed in accordance with claim 9 in which said electron device is the rectifying element in a keyed rectifier circuit direct-current coupled to said signal supplying means and wherein said control apparatus additionally includes pulse generating means for supplying pulses to said electron device to key said device into conduction, said pulses having peak portions substantially in overlapping time relationship with said horizontal back porch blanking level.

11. Control apparatus constructed in accordance with claim 9, wherein said control apparatus additionally includes means for supplying keying pulses to said electron device to key said device into conduction, said pulses having peak portions substantially in over-lapping time relationship with said synchronizing pulses, and said electron device is a pentode vacuum tube the control grid of which is direct-current coupled to said signal supplying means, the anode is coupled to said pulse supplying means and the screen and suppressor electrodes are coupled together through a synchronizing pulse aperture means for preventing the deriving of said amplitude variation-representative signal from said synchronizing pulses and for separating said synchronizing pulses from said supplied signals.

12. Control apparatus constructed in accordance with claim 11, in which the anode of said electron device is coupled to said pulse generating means through tuned circuit means for separating said color synchronizing signals from said supplied signal.

13. In a television receiver adapted to receive a composite color signal said receiver having image-reproducing apparatus including a signal-translating channel and an image-reproducing device, control apparatus comprising:

signal supplying means for supplying at least the horizontal back porch blanking level, synchronizing pulses and color synchronizing signals of said composite color signal;

means for supplying flyback pulses substantially in overlapping time relationship with said synchronizing pulses;

means, including only one electron device, responsive to said supplied signals and pulses for deriving a signal representative of variations in the amplitude of said blanking level and for separating said color synchronizing signals and said synchronizing pulses from said supplied signals, said device being a pentode vacuum tube, the control grid of which is direct-current coupled to said signal supplying means, the anode of which is coupled to said pulse supplying means through tuned circuit means used for separating said color synchronizing signal from said supplied signals and the screen and suppressor electrodes of which are coupled together through synchronizing pulse aperture means for preventing the deriving of said amplitude variation-representative signal from said synchronizing pulses and for separating said synchronizing pulses from said supplied signals;

means responsive to said separated synchronizing pulses for controlling the generation of a raster in said image-reproducing device;

means responsive to said derived signal for maintaining the composite color signal in said signal-translating channel within a desired signal intensity range for a wide range of received composite color signal intensities;

means responsive to said separated color synchronizing signals for controlling the operation of a color signal decoder in the image-reproducing apparatus;

and means also responsive to said derived signal for stabilizing said blanking level within said image-reproducing apparatus whereby correct black level operation at said image-reproducing device is obtained.

References Cited by the Examiner

UNITED STATES PATENTS

| | | | |
|---|---|---|---|
| 2,878,311 | 3/1959 | Squires | 178—7.3 |
| 3,038,026 | 6/1962 | Mothersole | 178—7.3 |
| 3,136,951 | 6/1964 | Taylor | 178—5.8 |
| 3,146,303 | 8/1964 | Taylor | 178—5.8 |
| 3,146,304 | 8/1954 | Taylor | 178—5.8 |
| 3,192,314 | 6/1965 | Taylor | 178—5.8 |

ROBERT L. GRIFFIN, *Primary Examiner.*

JOHN W. CALDWELL, *Examiner.*

J. H. SCOTT, J. A. O'BRIEN, *Assistant Examiners.*